United States Patent
Furukawa et al.

(10) Patent No.: US 8,340,468 B2
(45) Date of Patent: Dec. 25, 2012

(54) TEMPERATURE MEASURING DEVICE AND TEMPERATURE MEASURING METHOD

(75) Inventors: Yuichi Furukawa, Toyota (JP); Shingo Nakamura, Toyota (JP); Yuji Okada, Toyota (JP); Fumio Kawahara, Toyota (JP)

(73) Assignees: Toyota Jidosha Kabushiki Kaisha, Toyota-shi (JP); MEIWA e-TEC co., ltd., Toyota-shi (JP)

( * ) Notice: Subject to any disclaimer, the term of this patent is extended or adjusted under 35 U.S.C. 154(b) by 615 days.

(21) Appl. No.: 12/593,811

(22) PCT Filed: Mar. 25, 2008

(86) PCT No.: PCT/JP2008/056281
§ 371 (c)(1),
(2), (4) Date: Sep. 29, 2009

(87) PCT Pub. No.: WO2008/120774
PCT Pub. Date: Oct. 9, 2008

(65) Prior Publication Data
US 2010/0098321 A1 Apr. 22, 2010

(30) Foreign Application Priority Data
Mar. 30, 2007 (JP) ................................. 2007-094122

(51) Int. Cl.
*G06K 9/32* (2006.01)
(52) U.S. Cl. ...... 382/294; 374/112; 73/25.01; 250/316.1
(58) Field of Classification Search .................. 382/100, 382/103, 130, 141–153, 181, 190, 195, 201, 382/217–222, 293–298; 374/1, 2, 29, 100–102, 374/112; 73/25.01; 228/127; 250/316.1, 250/330
See application file for complete search history.

(56) References Cited

U.S. PATENT DOCUMENTS

| | | | | |
|---|---|---|---|---|
| 5,059,796 A | * | 10/1991 | Nakamura | 250/330 |
| 5,738,441 A | * | 4/1998 | Cambridge et al. | 374/102 |
| 6,246,321 B1 | * | 6/2001 | Rechsteiner et al. | 340/522 |
| 6,394,646 B1 | * | 5/2002 | Ringermacher et al. | 374/7 |
| 6,516,084 B2 | * | 2/2003 | Shepard | 382/141 |
| 6,614,922 B1 | * | 9/2003 | Walton | 382/141 |
| 8,013,304 B2 | * | 9/2011 | Haigh et al. | 250/339.09 |

FOREIGN PATENT DOCUMENTS

| | | |
|---|---|---|
| JP | 63 58222 | 3/1988 |
| JP | 4 283634 | 10/1992 |
| JP | 5 27637 | 4/1993 |

(Continued)

*Primary Examiner* — Anand Bhatnagar
(74) *Attorney, Agent, or Firm* — Oblon, Spivak, McClelland, Maier & Neustadt, L.L.P.

(57) ABSTRACT

Feature points (41, 42, 43) in the heat image (10) of a casting die (1) are extracted and a predetermined geometrical conversion processing is performed on the heat image (10) such that the feature points are superimposed on the reference feature points (61, 62, 63) set in a reference heat image (30) picked up previously to generate a corrected heat image (20). A difference image (40) is generated by superimposing the corrected heat image (20) and the reference heat image (30) such that the corrected feature points (51, 52, 53) in the corrected heat image (20) is superimposed on the corresponding reference feature points (61, 62, 63). With such an arrangement, a highly reliable difference image can be generated even when the imaging field of vision slips off among a plurality of heat images.

8 Claims, 7 Drawing Sheets

FOREIGN PATENT DOCUMENTS

| | | |
|---|---|---|
| JP | 2000 182033 | 6/2000 |
| JP | 2000 227362 | 8/2000 |
| JP | 2002 132341 | 5/2002 |
| JP | 2003 270049 | 9/2003 |
| JP | 2005 172683 | 6/2005 |

* cited by examiner

TEMPERATURE MEASURING DEVICE AND TEMPERATURE MEASURING METHOD

TECHNICAL FIELD

The present invention relates to a technique of measuring temperature, using a difference image generated by a reference heat image picked up previously with respect to an object and a heat image picked up in the object.

BACKGROUND ART

It is conventionally known that the technique, such as an infrared thermograph, for measuring a heat distribution of the surface of the object noncontactly by picking up the heat image of the object.

Such a noncontact measuring technique for heat distribution has advantages to performing real-time and detailed measurement more easily than the contact measuring method, and to facilitating the maintenance by reducing the failure caused by heat or impact due to the noncontact of the measuring device (especially detecting device such as a sensor).

It is also known that the technique for deciding the quality of the object (determining whether the object is normal or abnormal or whether the object is non-defective or defective) based on the temperature distribution of the surface of the object, and the technique includes (1) picking up a heat image of the reference object (the normal object or non-defective object), (2) picking up a heat image of the measurement object, and comparing the two heat images picked up in (1), (2).

The most convenience technique of comparing two images is to display two images side by side and look for differences, however, it is difficult for a decider to find a slight difference between the images and to insure the decision depending on experiment of the decider.

The other conventional technique of comparing two images is to calculate a "temperature difference" on the basis of temperature information of the pixels of the images for generating a "difference image" which represents the distribution of the temperature difference, and decide the quality in accordance with the difference image.

The conventional technique is, for example, disclosed in Patent Literature 1 (JP 2005-172683 A) and Patent Literature 2 (JP H05-27637 U).

The Patent Literature 1 discloses a technique for picking up the heat image (as the reference) in the initial state of the concrete structure, subsequently picking up the heat image (as the decision object) in the state of heating, and for comparing the two images, thereby deciding the defects of the object, such as the voids, shears, or honeycombs.

However, the technique disclosed in Patent Literature 1 has the case where the position relationship (distance or posture, etc.) between the measurement object and the picking up device (e.g. an infrared camera) may fail to be constant when picking up the images in both states (for example the case where the jig for fixing them is not accurately positioned, where the picking up device moves in response to wind or vibration, where the camera is removed from the fixing position and fixed again), and in that case, it unfortunately becomes difficult to superimpose the two images accurately (to superimpose not to shift the picked-up objects in the both images); as a result, the reliability of the difference image (of the temperature information in the difference image) is lowered.

Especially, if the object moves three-dimensionally against the picking up device, such as the situation that the distance between the object and the device changes, and that the imaging field-of-view of the device rotates around the picking-up direction, whereby superimposing the two images becomes difficult.

Therefore, in order to obtain the high-reliability difference image using the technique of Patent Literature 1, the device (infrared camera) should be fixed immovably to the structure and the object should be kept the constant distance and posture against the device by the jig.

The picking up devices such as the infrared camera must be calibrated regularly, and the camera will be removed from the fixing structure for the calibration. When the device is fixed to the structure after the calibration, the imaging field-of-view may shift from before the calibration, which causes the problem that it is difficult to obtain the high-accuracy difference image.

As mentioned above, the difference image may be only applicable to the case that it is easy to obtain the high-accuracy difference image due to the structures composing the measuring device.

The Patent Literature 2 discloses a technique of real-timely measuring the temperature change of the object, picking up the heat image of the object at "intervals", generating the difference image between the heat image picked up at the time and that picked up at the time passed the interval, and displaying the difference image.

However, the "intervals" of the Patent Literature 2 seems to be a couple of seconds in consideration of the application thereof, and the interval is based on the estimation that the position relationship between the device and the object would not shift, therefore, if the position relationship is shifted in short time, it becomes to difficult to obtain the high-accuracy difference image.

The technique is also known of picking up the heat image and the image picked up using the visible light of the same field-of-view. For example, disclosed in Patent Literature 3 (JP 2003-270049 A) and Patent Literature 4 (JP H04-283634 A).

In the techniques of the Patent Literatures 3 and 4, the visible light and the infrared light, which are incident from the same field-of-view, are divided into the picking-up elements, for picking up the images at the same time.

However, the techniques of the Patent Literatures 3, 4 are used for securing the accuracy (preventing the shifts) of superimposing the two images by means of picking up the images at the same time. Therefore, it is impossible to superimpose the two images with accuracy, which are picked up at the different time and at the different field-of-view.

The objective of the present invention is to provide a temperature measuring device and a temperature measuring method capable of generating a difference image with high reliability using multiple images, even if the imaging fields-of-view of the images differ from each other.

DISCLOSURE OF THE INVENTION

The objective of the present invention is mentioned above, and the means solving the problems are described below.

The first aspect of the present invention is a temperature measuring device, which contains a feature point choosing means for choosing a single feature point or multiple feature points from a heat image of a measurement object; a corrected heat image generating means for generating a corrected heat image by means of performing one or more image-processing to the heat image including rotating, sliding, enlarging and reducing in such a way that the feature point(s) of the heat image is(are) superimposed on a reference feature point(s) of a reference heat image picked up in advance, on the basis of a coordinate(s) of the feature point(s) of the heat image chosen by the feature point choosing means and a coordinate(s) of the reference point(s) of the reference heat image set in advance; and a difference heat image generating means for generating a difference image as difference between the corrected heat image and the reference heat image, with the corrected heat image generated being superimposed on the reference image in such a way that the feature point(s) of the corrected heat image is(are) superimposed on the reference feature point(s) of the reference heat image.

In the preferable embodiment, the temperature measuring device further includes an image pick up means for picking up the heat image.

In the preferable embodiment, one or more points of the feature point(s) in the heat image is(are) single pixel or a cluster of pixels of the heat image and displaying the highest or lowest temperature in predetermined area(s) set in the heat image, and one or more points of the reference feature point(s) in the reference heat image is(are) single pixel or a cluster of pixels of the reference heat image and displaying the highest or lowest temperature in predetermined area(s) set in the reference heat image.

In the present invention, it is advantageous that the measurement object is a casting mold.

The second aspect of the present invention is a temperature measuring method, which contains a step of picking up a heat image of a measurement object; a step of choosing a single feature point or multiple feature points from the heat image of the measurement object; a step of generating a corrected heat image by means of performing one or more image-processing to the heat image including rotating, sliding, enlarging and reducing in such a way that the feature point(s) of the heat image is(are) superimposed on reference feature point(s) of a reference heat image picked up in advance, on the basis of a coordinate(s) of the feature point(s) of the heat image and a coordinate(s) of the reference point(s) of the reference heat image set in advance; and a step of generating a difference image as difference between the corrected heat image and the reference heat image, with the corrected heat image generated being superimposed on the reference image in such a way that the feature point(s) of the corrected heat image is(are) superimposed on the reference feature point(s) of the reference heat image.

In the preferable embodiment, one or more points of the feature point(s) in the heat image is(are) a single pixel or a cluster of pixels of the heat image and displaying the highest or lowest temperature in predetermined area(s) set in the heat image, and one or more points of the reference feature point(s) in the reference heat image is(are) a single pixel or a cluster of pixels of the reference heat image and displaying the highest or lowest temperature in predetermined area(s) set in the reference heat image.

In the present invention, it is advantageous that the measurement object is a casting mold.

According to the present invention, it is provided to generate a difference image with high reliability using multiple images, even if the imaging fields-of-view of the images differ from each other.

THE BEST MODE FOR CARRYING OUT THE INVENTION

Referring FIGS. 1 to 6, a temperature measuring device 100 as an embodiment of the present invention will be followed.

Figure 1:
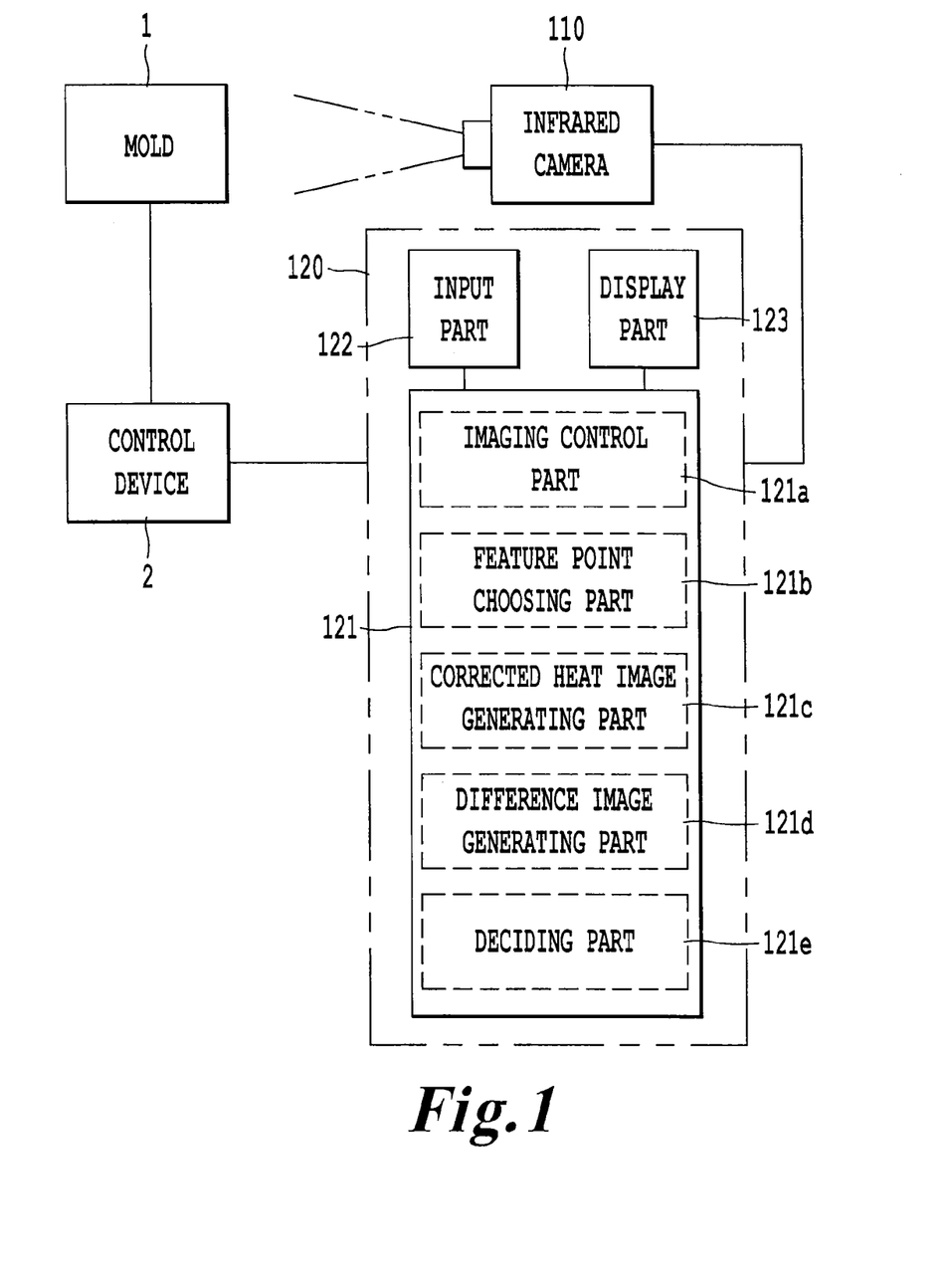
FIG. 1 depicts a temperature measuring device.

As shown in FIG. 1, the device 100 contains an infrared camera 110, a controller 120.

The infrared camera 110 is an embodiment of the heat image picking up means of the present invention and picks up a heat image 10 of a casting mold 1.

The infrared camera 110 contains a detecting device consisting of an HgCdTe semiconductor device arranged in two-dimensional arrays, capable of detecting the infrared whose wavelength is about 5 μm to 15 μm, which obtains the distribution of the infrared strength at the certain area in the imaging field-of-view (the temperature distribution at the certain area in the imaging field-of-view) of the infrared camera 110.

It should be noted that the detecting device of the camera 110 is the HgCdTe semiconductor device arranged in two-dimensional arrays, however, other detecting devices may be used as that of the camera.

The mold 1 is an embodiment of the object of the present invention. The mold 1 is a mold for molding a casting to the given shape and has a cavity that is defined in the mold with corresponding shape.

The mold 1 has a coolant passage and a heater therein. In the coolant passage, the coolant passes through and cools the mold 1, thereby preventing failures and deformation and controlling the temperature of the mold. The heater heats the mold 1 for controlling the temperature of the mold.

The mold 1 is connected to a control device 2, which controls the members included in the mold 1 (e.g. adjusts the heater in the mold 1; actuates the hydraulic cylinder for opening and closing the mold 1; or actuates the hydraulic cylinder for sliding the plunger in the sleeve and feeds the molten metal into the mold 1), the control device is a programmable logic controller (PLC).

In the embodiment, the device 2 is the PLC, however, it may be provided that the commercial personal computer or workstation in which the program is stored.

Figure 2:
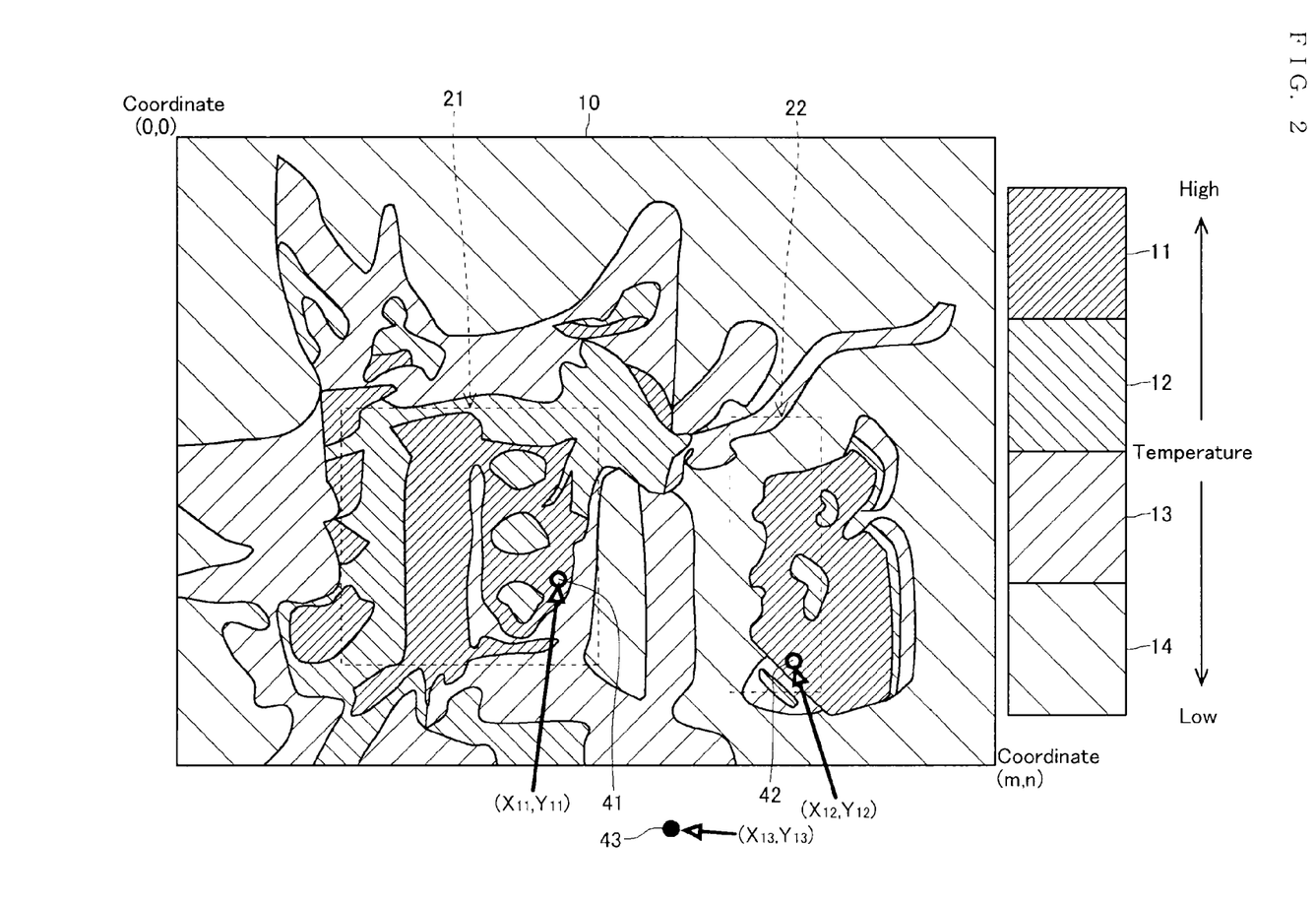
FIG. 2 depicts a heat image.

As shown in FIG. 2, the heat image 10 is an embodiment of the heat image of the present invention and is an image representing the temperature distribution in the imaging field-of-view of the camera 110. The heat image 10 is configured as pixels arranged in a matrix form of m lines in the lateral direction and n lines in the vertical direction. Each pixel composing the heat image can identify the coordinate (X, Y) in the image and has temperature information.

The temperature information relates to surface temperature of each part in the field-of-view of the picking up means and the pixels have the information. The temperature information may relate to the temperature, however, the information is constructed by detected energy (amount) of the infrared, in which the energy is detected at the area by the detecting device of the picking up means.

The number of lines of pixels in the both directions (m, n) or the number of total pixels (m multiplies n) may be set in accordance with the purpose of the temperature measuring device or the character of the object.

The method of identifying the coordinate (X, Y) of the pixels (or dealing with the data regarding heat image) may be connecting the coordinate (X, Y) with the temperature information or obtaining a series of information in which the temperature information is arranged for connecting the order in the series with the coordinate (X, Y) (e.g. addressing as the CSV (Comma Separated Value) data).

In the embodiment, using the temperature information of the pixels composing the heat image 10, the temperatures of the corresponding parts with the pixels of the heat image 10 are calculated.

When displaying the heat image 10 in a display part 123, as shown in FIG. 2, it is decided which range the temperature of the each pixel belongs to; within predetermined four ranges 11, 12, 13, 14. The four ranges 11, 12, 13, 14 are set continuously from high temperature to low temperature, and different colors are set for the four ranges 11, 12, 13, 14 (for convenience sake, shown by different hatchings in FIG. 2).

In the display part 123, the heat image 10 is represented in four colors as the pixels are colored with respect to the belonging range, 11, 12, 13, or 14. Such image processing for the heat image 10 is performed in the controller 120.

The four ranges 11, 12, 13, 14 are set in the embodiment, however, more number of ranges may be preferable.

The description of the controller 120 will be followed, referring FIG. 1. The controller 120 includes a control unit 121, an input part 122, and the display part 123.

The control unit 121 controls the operation of the device 100. The control unit 121 contains a storage for storing various programs (such as an imaging control program, a feature point choose program, a corrected heat image generate program, a difference image generate program, and a decide program), a compiler for compiling the programs, a calculator for calculating in accordance with the programs, and a memory for memorizing the calculated value.

The control unit 121 may be a one-chip LSI or have a construction in which CPU, ROM, RAM, HDD and the like are connected via bus.

The control unit 121 is unique for the present invention, but it may be alternated with the commercial personal computer or workstation in which the program is stored.

The control unit 121 is connected to the camera 110, and transmits the signal (trigger signal) to perform the camera 110 and receives the information (image data) relating the heat image 10 picked up by the camera 110.

The control unit 121 is also connected to the control device 2, controlling the mold 1, obtains the signal (timing signal) to pick up the heat image of the mold 1.

The input part 122 is connected to the control unit 121 and inputs the various information and directions to operate the device 100.

The input part 122 is unique for the present invention, but it may be alternated with the commercial keyboard, mouse, pointing device, button, or switch.

The display part 123 displays the operation situation of the device 100, the inputted contents from the input part 122 to the control unit 121 or the measured value by the device 100.

The display part 123 is unique for the present invention, but it may be alternated with the commercial monitor or liquid crystal display.

The detailed structure of the control unit 121 is described below. The control unit 121 includes an imaging control part 121a, a feature point choosing part 121b, a corrected heat image generating part 121c, a difference image generating part 121d, and a deciding part 121e.

Referring FIG. 1, the imaging control part 121a is described.

The part 121a controls the camera 110 for picking up the heat image 10.

Concretely, the control unit 121 performs the calculation in accordance with the imaging control program stored in the storage and serves as the imaging control part 121a.

The control device 2 for controlling the mold 1 transmits the timing signal to pick up the heat image of the mold 1 to the control unit 121 (the part 121a).

The part 121a obtains the timing signal from the device 2, and transmits the trigger signal to the camera 110.

The camera 110 obtains the trigger signal from the part 121a, picks up the heat image 10 of the mold 1, and transmits the information relating the heat image 10 (image data) to the memory (such as a hard disc drive) of the controller 120.

Referring FIGS. 1, 2, the feature point choosing part 121b is described.

The part 121b is an embodiment of the feature point choosing means and chooses feature points 41, 42, 43 from the heat image 10 of the mold 1.

The control unit 121 performs the calculation or the like in accordance with the feature point choose program stored in the storage, and the control unit 121 serves as the feature point choosing part 121b.

As shown in FIG. 2, the feature points 41, 42 are the embodiment of the feature points of the present invention and are chosen in the pixels (the number of the pixels is obtained by multiplying n by m) of the heat image 10, hence (a) a single pixel or (b) pixels (cluster of pixels).

The Feature Points represent the single pixel or cluster of pixels, which are chosen from the pixels included in the heat image of the object, according to the character of the object or by performing any action for the object, using the temperature information of the pixel with distinguished from the surrounding pixels.

In the embodiment, the mold 1 has the heater that heats the mold 1 before casting, so in the surface of the mold 1 there exists the portion with higher temperature than surroundings and the portion is previously known.

After casting, the coolant passing through the coolant passage cools the mold 1, however, the temperature distribution of the surface is varied due to the configuration of the passage. Therefore, in the surface of the mold 1, there exists the portion with higher temperature or lower temperature and the portion is previously known.

As mentioned above, the casting mold 1 constitutionally has particular portions where the temperature becomes higher than surroundings, and the feature points are chosen as the single pixel or pixels corresponding to the particular portions.

In the embodiment, considering the structural character of the mold 1, the mold 1 is arranged in position with respect to the camera 110, the pixel areas 21, 22 are set corresponding with the particular portions that become higher temperature when picking up the heat image 10 of the mold 1 and the coordinates of the areas 21, 22 are stored in the storage of the control unit 121.

On the basis of the coordinate information of the areas 21, 22 and the information relating the heat image 10 (image data) stored in the storage of the control unit 121, the part 121b chooses the single pixel or pixels (cluster of pixels) where the higher temperature (temperature calculated according to the temperature information of the pixel) is displayed in the areas 21, 22 as the feature points 41, 42, respectively.

When the feature points 41, 42 are the cluster of pixels, the temperature to be displayed is selected by the average, intermediate, lowest or highest temperature in the pixels included in the cluster.

The feature point 43 is different from the feature points 41, 42, and is set as the point where "no shift" occurs between the mold and camera when picking up the image due to the condition such as the geometrical relationship of the positions (e.g. distance, posture) between the mold 1 and the camera 110 when picking up the image and the method of fixing the mold 1 and camera 110.

In addition, the feature point 43 may be set in the heat image 10 or out of the heat image 10 as a virtual point like the embodiment.

In the embodiment, in the predetermined areas 21, 22 of the heat image 10, the single pixel or cluster of pixels which have the highest temperature are chosen as the feature points 41, 42, according to the character of the object, the single pixel or cluster of pixels which have the lowest temperature may be chosen from the predetermined area or areas of the heat image.

Alternatively, due to the character of the object, there are the cases where the feature points are not properly chosen, for example, when the higher or lower temperature portions do not appear at the surface of the object or there is little difference in temperature from the surroundings. In such cases, it is preferable to intentionally create the feature points on the surface of the object by means of performing a special action, for example providing a heat source (e.g. a heater) at the specific portions of the object for creating the higher-temperature portions than the surroundings.

In the situation that the feature points are the cluster of the pixels, the configuration of the cluster may be (a) four pixels formed as a square arranging two by two pixels, (b) five pixels formed as a cross or (c) nine pixels formed as a square arranging three by three pixels.

It should be mentioned that in the view of obtaining the accuracy to generate the difference image or a corrected heat image, the feature points are advantageously as small as possible.

In the embodiment, in the three feature points 41, 42, 43, the two points 41, 42 are respectively chosen on the basis of the temperature information in the areas 21, 22, the rest point 43 is chosen is chosen from the points where the shifts do not occur caused by the condition such as the geometrical relationship of the positions between the mold 1 and the camera 110 or the fixing embodiment of the mold 1 or the camera 110, however, (a) the three feature points may be chosen on the basis of the temperature information in the corresponding areas, or (b) the one point may be chosen on the basis of the temperature information and the two points may be chosen from the points where the shifts do not occur caused by the condition such as the geometrical relationship of the positions between the object and the heat image picking up means or the fixing embodiment of the object or the heat image picking up means.

In the single feature point or multiple points, at least one point may be chosen on the basis of the temperature information from the corresponding area.

Referring FIGS. 1, 3, 4, 5, the corrected heat image generating part 121c is described.

Figure 3:
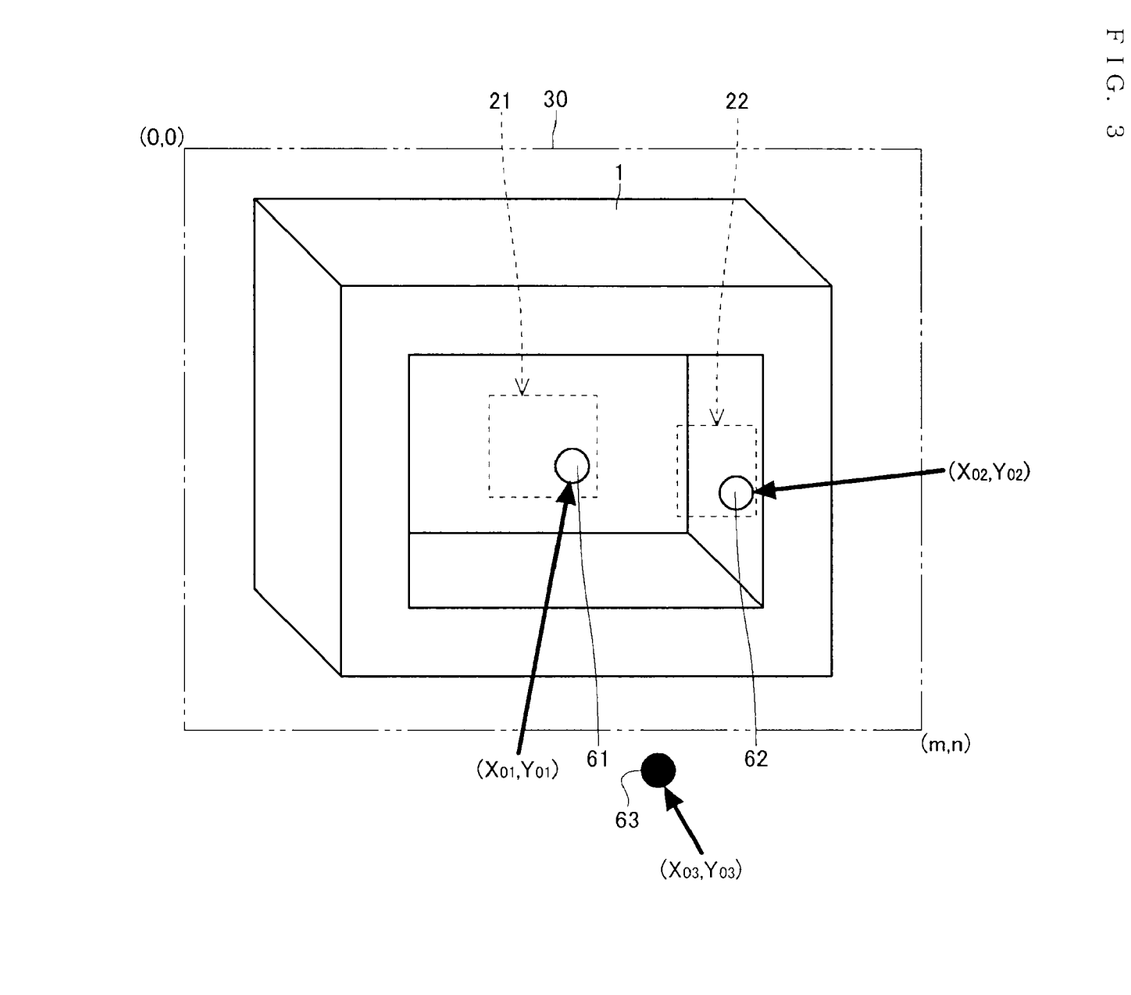
FIG. 3 is a schematic view representing a reference heat image.
Figure 4:
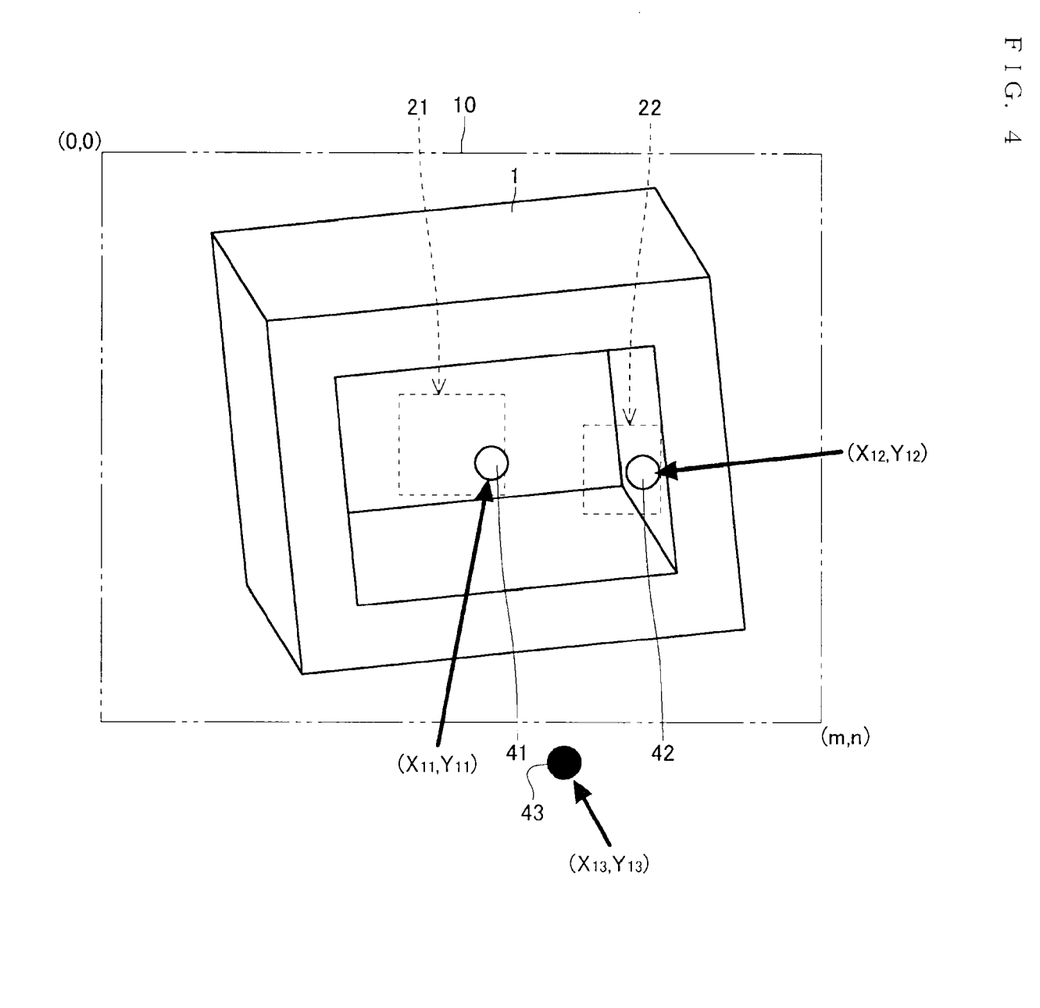
FIG. 4 is a schematic view representing a heat image.
Figure 5:
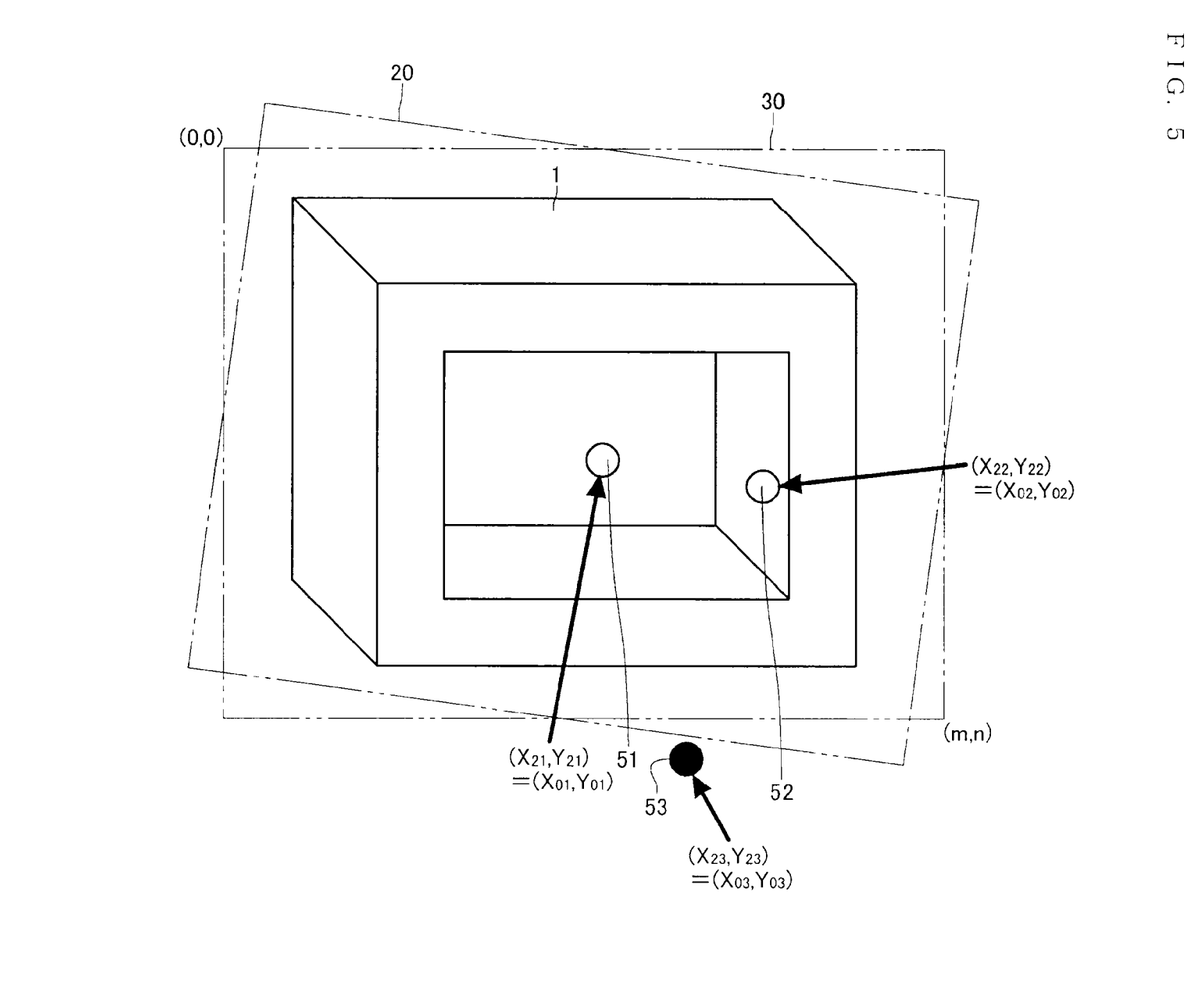
FIG. 5 is a schematic view representing a corrected heat image.

In this description, FIGS. 3 to 5 depict, for convenience, the heat image 10, corrected heat image 20, and reference heat image 30 respectively, with the outlines of the mold 1 in the case that the camera is used for detecting the visible light in the same field-of-view.

The part 121c is an embodiment of the corrected heat image generating means according to the present invention and generates the corrected heat image 20 by performing one or more image-processing to the heat image 10 including rotating, sliding, enlarging and reducing in such a way that the feature points 41, 42, 43 of the heat image 10 are superimposed on reference feature points 61, 62, 63 of the reference heat image 30, respectively, on the basis of the coordinates $(X_{11}, Y_{11})$ of the point 41, $(X_{12}, Y_{12})$ of the point 42 and $(X_{13}, Y_{13})$ of the point 43 of the heat image 10 chosen by the part 121b and the coordinates $(X_{01}, Y_{01})$ of the point 61, $(X_{02}, Y_{02})$ of the point 62 and $(X_{03}, Y_{03})$ of the point 63 of the reference heat image 30 of the mold 1 set in advance.

The control unit 121 performs the calculation in accordance with the corrected heat image generate program stored in the storage and serves as the corrected heat image generating parts 121c.

The control unit 121 stores in the memory (e.g. the hard disc drive) the information regarding the coordinates $(X_{01}, Y_{01})$ of the point 61, $(X_{02}, Y_{02})$ of the point 62 and $(X_{03}, Y_{03})$ of the point 63 of the reference heat image 30 of the mold 1 set in advance.

The reference heat image is (i) a heat image showing the reference object picked up as the object in the situation that the same object as the measurement object appears to be normal (abnormality does not exist) or (ii) a heat image showing the reference object picked up as the one object being non-defective (normal) chosen from the multiple objects in the situation that there are the multiple objects having the same shape as the measurement object.

In the embodiment, the mold 1 as the measurement object is used repeatedly, so that the reference heat image 30 is the option (i).

The Non-defective Situation of the mold 1 may be optionally set, for example, as the situation that there does not occur the stick or leakage in the cooling passage, the heater has no trouble and the cavity face of the mold 1 is not wearing surface or not failure, so that the every part of the mold 1 shows the desired temperature distribution when picking up.

In the case where the reference heat image of the option (ii) is selected, for example the multiple casting objects molded by the same mold are picked up in the same place and posture.

The reference heat image 30 is picked up once, but the reference heat image according to the present invention is not limited in such a case, the reference heat image may be decided to be a reference image having the coordinate information associated with the average of the temperature information of the pixels corresponding to the heat images picked up multiple times.

The Reference Feature Points represent the feature points in the reference heat image. The Points are the single pixel or cluster of pixels, which are chosen from the pixels included in the heat image of the object, according to the character of the reference object or by performing any action for the reference object, using the temperature information of the pixel with distinguished from the surrounding pixels.

The method of registering the coordinate information of the points 61, 62, 63 will be described below.

As shown in FIG. 3, in advance with the measurement of the mold 1, the camera 110 of the device 100 picks up the reference heat image 30 of the mold 1, and the image 30 is stored (registered) in the storage of the unit 121.

The unit 121 chooses the points 61, 62, 63 on the basis of the image 30. The method of choosing the points 61, 62, 63 is the same as that of choosing the points 41, 42, 43 by the feature points choosing part 121b.

As to the points 61, 62, on the basis of the Coordinate Information for the areas 21, 22 and the Information for the image 30 (image data) stored in the storage of the unit 121, the point 61 is chosen as the single pixel or cluster where shows the highest temperature in the pixels contained in the area 21, and the point 62 is chosen as the single pixel or cluster where shows the highest temperature in the pixels contained in the area 22. In this case, the coordinate information of the areas 21, 22 in the heat image 10 and that of the reference heat image 30 are same.

As to the point 63, the point is chosen as the point 63 where has the same coordinate as the point 43.

Choosing the points 61, 62, 63, the unit 121 calculates the coordinates $(X_{01}, Y_{01})$ of the point 61, $(X_{02}, Y_{02})$ of the point 62 and $(X_{03}, Y_{03})$ of the point 63, and the unit 121 stores (registers) the information regarding these coordinates in the memory (e.g. the hard disc drive).

The way to generate the corrected heat image 20 by the part 121c is specified.

First, the part 121c calculates (obtains) the coordinates $(X_{11}, Y_{11})$ of the point 41, $(X_{12}, Y_{12})$ of the point 42 and $(X_{13}, Y_{13})$ of the point 43 in the heat image 10 chosen by the part 121b.

Next, the part 121c compares the coordinates $(X_{11}, Y_{11})$ of the point 41, $(X_{12}, Y_{12})$ of the point 42 and $(X_{13}, Y_{13})$ of the point 43 chosen by the part 121b with the coordinates $(X_{01}, Y_{01})$ of the point 61, $(X_{02}, Y_{02})$ of the point 62 and $(X_{03}, Y_{03})$ of the point 63 stored in the memory of the control unit 121 (see FIGS. 3, 4).

More specifically, the part 121c calculates the coordinate difference between the reference feature points and the feature points. In the embodiment, the reference feature points 61, 62, 63 correspond with the feature points 41, 42, 43, respectively, so the part calculates the differences $(X_{11}-X_{01}, Y_{11}-Y_{01})$, $(X_{12}-X_{02}, Y_{12}-Y_{02})$ and $(X_{13}-X_{03}, Y_{13}-Y_{03})$.

Then, the part 121c decides whether the difference between the feature points and the reference feature points exists or not.

More specifically, ($\alpha$) the part 121c decides that there does not exist the difference between the feature points and the reference feature points, when the differences $(X_{11}-X_{01}, Y_{11}-Y_{01})$, $(X_{12}-X_{02}, Y_{12}-Y_{02})$ and $(X_{13}-X_{03}, Y_{13}-Y_{03}) = (0, 0)$.

On the other hand, ($\beta$) the part 121c decides, in the other case of ($\alpha$), that there exists the difference when all of the six differences $X_{11}-X_{01}, Y_{11}-Y_{01}, X_{12}-X_{02}, Y_{12}-Y_{02}, X_{13}-X_{03}, Y_{13}-Y_{03}$ are not zero.

The part 121c decides that there is no coordinate difference between the reference feature points and the feature points, and regards the heat image 10 as the corrected heat image 20 without performing any image processing to the heat image 10.

The part 121c decides that there exists coordinate difference between the reference feature points and the feature points, and performs one or more image-processing including rotating, sliding, enlarging and reducing to the heat image 10 in such a way that the feature points 41, 42, 43 of the heat image 10 are superimposed on the reference feature points 61, 62, 63 of the reference heat image 30.

The Rotating means the image-processing for rotating the heat image around the axis perpendicular to the image surface. Note that the rotation axis of the rotating processing may be set inside or outside of the heat image.

The Sliding means the image-processing for sliding the heat image in the parallel direction to the image surface.

The Enlarging and Reducing means the image-processing for enlarging or reducing the heat image from the reference point. Note that the reference point for the enlarging or reducing processing may be set inside or outside of the heat image.

The method of performing one or more image-processing such as rotating, sliding, enlarging or reducing may be a geometric correction, for example an affine transformation (linear transformation) that is well known image-processing.

The part 121c regards the heat image 10 performed the above image-processing as the corrected heat image 20.

As shown in FIG. 5, corrected feature points 51, 52, 53 of the corrected heat image 20 correspond to the feature points 41, 42, 43 of the heat image 10. The coordinates $(X_{21}, Y_{21})$ of the point 51, $(X_{22}, Y_{22})$ of the point 52 and $(X_{23}, Y_{23})$ of the point 53 of the corrected heat image 20 are same as the coordinates $(X_{01}, Y_{01})$ of the point 61, $(X_{02}, Y_{02})$ of the point 62 and $(X_{03}, Y_{03})$ of the point 63 of the reference heat image 30 (namely, meeting the relationships $(X_{21}, Y_{21})=(X_{01}, Y_{01})$, $(X_{22}, Y_{22})=(X_{02}, Y_{02})$ and $(X_{23}, Y_{23})=(X_{03}, Y_{03})$).

After that, the part 121c generates the corrected heat image 20, and the unit 121 stores the corrected heat image 20 in the memory (e.g. the hard disc drive).

In the case that the rotation angle of the rotating processing is larger than the given angle, that the slide distance of the sliding processing is larger than the given distance, or that the magnification of the enlarging or reducing processing is out of the given range (including 1.0 time), assuming that the relative distance and position between the camera 110 and the mold 1 shift excessively, the part 121c decides "measurement fail" in view of securing the reliability of the difference image and stops to generate the difference image.

The above-mentioned given angle, given distance and given range should be set in consideration of the heat image picking up means, the characteristics of the object and pick-up situation.

Considering the unique determination of the image-processing (to determine the unique solution of the image-processing) by the part 121c, the feature points 41, 42, 43 are chosen as they are not on the same line in the heat image 10 (including the virtual plane continuous with the heat image 10), however, four or more feature points may be chosen with respect to the present invention, and any three of the points is used to perform the image-processing or lead the optimum solution of the image-processing by means of the method of least squares (determine the optimum combination of the three points within the chosen points).

The advantage of choosing four or more feature points is, for example, to choose the necessary number of points, even in the case where all of the feature points can not be chosen properly since the foreigners such as the burr of the casting are attached, in the process of casting cycle, to the surface of the mold 1 corresponding to the feature point and the attached portion may fail to become sufficiently higher than the surroundings.

In the case where only the sliding processing is performed when generating the corrected heat image due to the geometrical relationship (distance or posture) between the object and the heat image picking up means in picking up the image or to the fixing method of the object and heat image picking up means, the single feature point (or one feature point chosen from the two or more feature points for generating the corrected heat image) is sufficient. In this case, considering the foreigners attached to the surface, two or more feature points may be chosen and one point optionally chosen from the points is used as the feature point.

Figure 6:
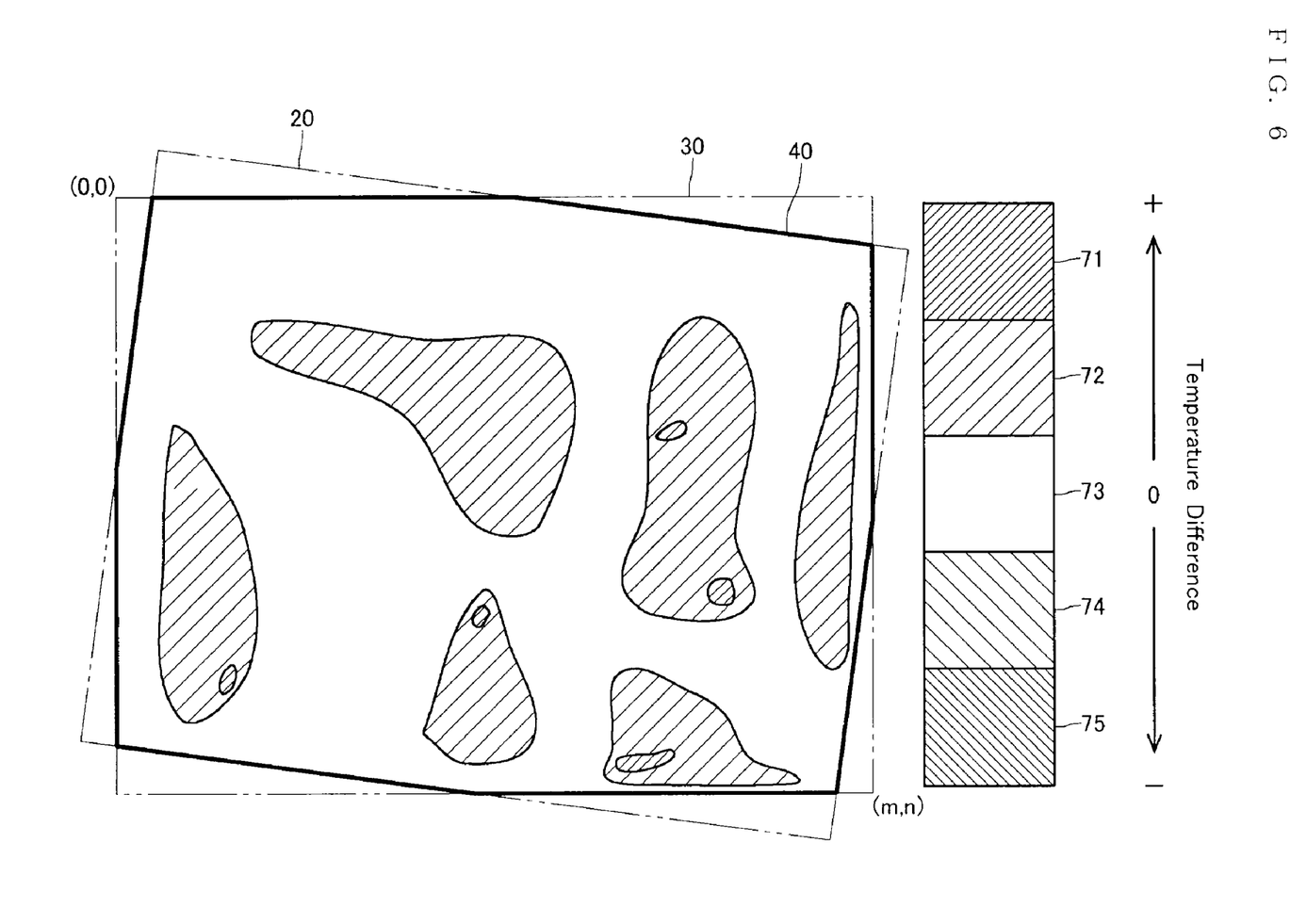
FIG. 6 is a schematic view representing a difference image.

Referring FIGS. 1, 6, the difference image generating part 121d is described.

The part 121d is an embodiment of the difference image generating part according to the present invention and generates a difference image 40 as the difference between the corrected heat image 20, generated by the part 121c, and the reference heat image 30, with the image 20 being superimposed on the image 30 in such a way that the feature points (corrected feature points 51, 52, 53) of the image 20 are superimposed on the reference feature points 61, 62, 63 of the image 30.

The Difference Image is the image representing the difference between the corrected heat image and the reference heat image, in detail, depicting the temperature-difference distribution of the pixels of the corrected heat image and the reference heat image corresponding each other (at the same coordinates).

As shown in FIG. 6, in the part 121*d*, the overlapped area (the area surrounded by the broad line in FIG. 6) of the two images 20, 30 is set as a Valid Area, when two images 20, 30 are superimposed in such a away that the feature points (corrected feature points 51, 52, 53) of the corrected heat image 20 generated by the part 121*c* are superimposed on the reference feature points 61, 62, 63 of the reference heat image 30.

The part 121*d* calculates the temperature difference (the difference of the temperature calculated using the temperature information) between the pixels composing the images 20, 30 within the valid area, on the basis of the temperature information of the pixels of the images 20, 30.

The difference image 40 is generated, in which the coordinates information of the pixels in the valid area are associated with the temperature-difference information (the calculated information of the temperature difference).

As shown in FIG. 6, the each (value of) temperature difference in the pixels composing the image 40 is decided which range it belong to; the predetermined temperature ranges 71, 72, 73, 74, and 75. These ranges 71, 72, 73, 74, and 75 continues from high to low without duplicity and are colored by different colors (in FIG. 6, the colors are represented by the different hatching).

When displaying the difference image 40 on the display part 123, each pixel composing the image 40 is colored according to the temperature ranges 71, 72, 73, 74, and 75.

Note that the temperature range is divided into five ranges 71, 72, 73, 74, and 75, however, the temperature range may be divided into more number of ranges.

The difference image 40 includes all pixels in the valid area into the image 40, however, the periphery of the valid area may be trimmed.

The deciding part 121*e* is described referring FIG. 1.

The part 121*e* decides the condition of the mold 1 using the difference image 40.

Concretely, the control unit 121 performs the calculation in accordance with the decide program stored in the storage and serves as the deciding part 121*e*.

On the basis of the temperature-difference information of the pixels in area (which may be set in any area), when the maximum and minimum of the temperature-difference are in "the predetermined range," the part 121*e* decides the mold 1 is normal (abnormality does not exist in the mold 1).

On the other hand, when the maximum or minimum of the temperature-difference go beyond "the predetermined range," the part 121*e* decides the mold 1 is abnormal (abnormality exists in the mold 1).

The part 121*e* displays the decision result on the display part 123, and stores that in the memory (e.g. the hard disc drive).

Notice that the method of deciding using the difference image is just one embodiment, so the present invention is not limited to this embodiment. How to decide the difference image may be chosen according to the characteristics of the measurement object.

As described above, the temperature measuring device 100 contains: the feature points choosing part 121*b* for choosing the feature points 41, 42, 43 from the heat image 10; the corrected heat image generating part 121*c* for generating the corrected heat image 20, on the basis of the coordinates of the feature points 41, 42, 43 of the heat image 10 chosen by the part 121*b* and the coordinates of the reference feature points 61, 62, 63 set in the reference heat image 30 of the mold 1 in advance, by performing one or more image-processing, including rotating, sliding, enlarging or reducing, to the heat image 10 in such a way that the feature points 41, 42, 43 are superimposed on the reference feature points 61, 62, 63 of the reference heat image 30; and the difference image generating part 121 e for generating the difference image 40 as the difference between the corrected heat image 20 and the reference heat image 30 by superimposing two images 20, 30 in such a way that the feature points (51, 52, 53) of the corrected heat image 20 generated by the part 121*c* are superimposed on the reference feature points 61, 62, 63.

Due to the above structure, when there occurs a difference in the imaging field-of-views of the images 10, 30, using the coordinate information of the points 41, 42, 43 and 61, 62, 63, the heat image 10 is corrected geometrically, thereby superimposed on the reference heat image 30 with high accuracy.

As a result, the difference image 40 of high reliability (high accuracy in the temperature information) generated easily.

Preferably, the device 100 includes the infrared camera 110 for picking up the heat images.

Accordingly, in the case that there occurs the change of the position relationship (distance or posture) between the mold 1 and the camera 110 when picking up the images 10, 30, and there occurs a difference in the imaging field-of-views of the images 10, 30, using the coordinate information of the points 41, 42, 43 and 61, 62, 63, the heat image 10 is corrected geometrically, thereby superimposed on the reference heat image 30 with high accuracy.

As a result, the difference image 40 of high reliability (high accuracy in the temperature information) generated easily.

One or more points (the embodiment shows two feature points 41, 42) within the feature points 41, 42, 43 in the heat image 10 are single pixel or cluster of pixels of the heat image 10 and displaying the highest or lowest temperature in the predetermined areas 21, 22 set in the heat image 10, and one or more points (the embodiment shows two feature points 61, 62) within the feature points 61, 62, 63 in the reference heat image 30 are single pixel or cluster of pixels of the reference heat image 30 and displaying the highest or lowest temperature in the predetermined areas 21, 22 set in the reference heat image 30.

Due to the above structure, there is no need to obtain the information for the position relationship (distance or posture) between the mold 1 and the camera 110 when picking up the images 10, 30, and choosing the feature points 41, 42 is only based on the image data of the image 10, choosing the reference feature points 61, 62 is also only based on the image data of the image 30.

As a result, without keeping, with high accuracy, the position relationship between the mold 1 and the camera 110 when picking up the images 10, 30, the difference image 40 of high reliability (high accuracy in the temperature information) generated easily, thereby facilitating the workability.

The measurement object of the device 100 is the casting mold 1.

Thus, it becomes easy to decide whether the mold 1 repeated casting is normal or abnormal on the basis of the difference image 40, thereby improving the management quality for the casting process and reducing the managing labor (or the management costs).

Figure 7:
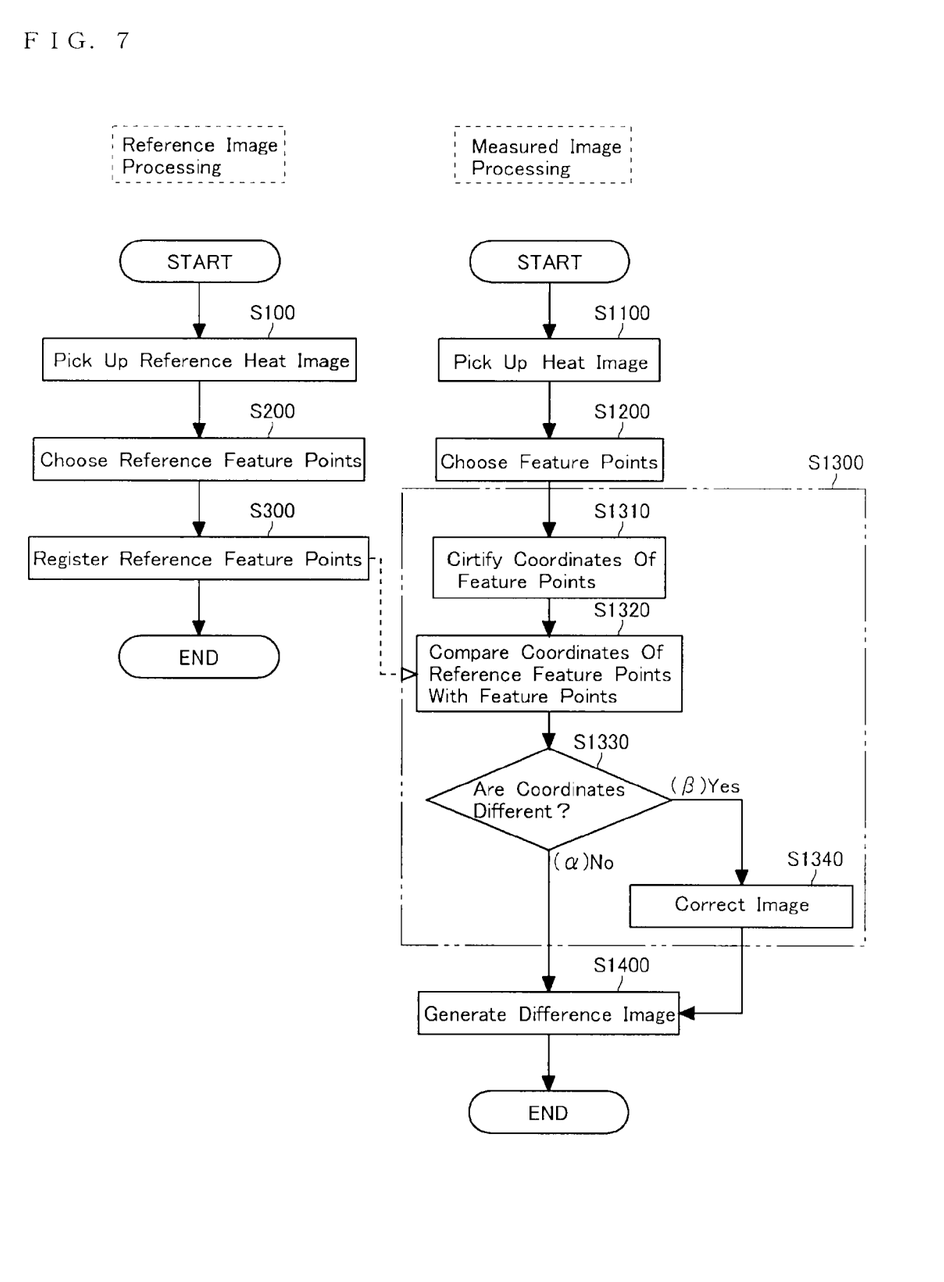
FIG. 7 is a flowchart showing a temperature measuring method.

Referring FIG. 7, the temperature measuring method according to the present invention will be followed.

The temperature measuring method is a method of generating the difference image 40 using the device 100, and as the actual measuring step (measured image processing step), includes heat image picking up step S1100, feature points choosing step S1200, corrected heat image generating step S1300, and difference image generating step S1400. The method also includes a step (reference image processing step) of registering the reference feature points 61, 62, 63 on the basis of the reference heat image 30 as a pre-step.

The step of registering the reference feature points 61, 62, 63 from the reference heat image 30 is specified below.

The step of registering the reference feature points 61, 62, 63 from the reference heat image 30 includes reference heat image picking up step S100, reference feature points choosing step S200, and reference feature points registration step S300.

In the step S100, the reference heat image 30 of the mold 1 is picked up.

In the step S100, the camera 110 of the device 100 picks up the reference heat image 30 of the mold 1, and the control unit 121 stores (registers) the image 30 in the memory (e.g. hard disc drive).

After the step S100, the step S200 is carried out.

In the step S200, the reference feature points 61, 62, 63 are chosen from the reference heat image 30.

In the step S200, as to the points 61, 62, on the basis of the Coordinate Information for the areas 21, 22 and the Information for the image 30 (image data) stored in the storage of the unit 121, the point 61 is chosen as the single pixel or cluster where shows the highest temperature in the pixels contained in the area 21, and the point 62 is chosen as the single pixel or cluster where shows the highest temperature in the pixels contained in the area 22.

After the step S200, the step S300 is carried out.

In the step S300, the coordinates $(X_{01}, Y_{01})$ of the point 61, $(X_{02}, Y_{02})$ of the point 62 and $(X_{03}, Y_{03})$ of the point 63 are stored (registered) in the memory (e.g. the hard disc drive) of the control unit 121.

In the step S300, the control unit 121 calculates the coordinates $(X_{01}, Y_{01})$ of the point 61, $(X_{02}, Y_{02})$ of the point 62 and $(X_{03}, Y_{03})$ of the point 63, and the unit 121 stores (registers) the information regarding these coordinates in the memory (e.g. the hard disc drive).

The actual measuring step (measured image processing step) as one embodiment of the present invention is specified below.

In the step S1100, the heat image 10 of the mold 1 is picked up.

In the step S1100, the camera 110 obtains the trigger signal from the imaging control part 121a, picks up the heat image 10 of the mold 1, and transmits the information relating the heat image 10 (image data) to the memory (such as a hard disc drive) of the control unit 121.

After the step S1100, the step S1200 is carried out.

In the step S1200, the feature points 41, 42, 43 are chosen from the heat image 10 of the mold 1 picked up in the step S1100.

In the step S1200, on the basis of the coordinate information of the areas 21, 22 and the information relating the heat image 10 (image data) stored in the storage of the control unit 121, the feature point choosing part 121b chooses the single pixel or pixels (cluster of pixels) where the higher temperature (temperature calculated according to the temperature information of the pixel) is displayed in the areas 21, 22 as the feature points 41, 42, respectively. Moreover, the part 121b chooses the feature point 43 as the point where "no shift" occurs between the mold 1 and camera 110 when picking up the image due to the condition such as the geometrical relationship of the positions (e.g. distance, posture) between the mold 1 and the camera 110 when picking up the image and the method of fixing the mold 1 and camera 110.

After the step S1200, the step S1300 is carried out.

In the step S1300, the corrected heat image 20 is generated by performing one or more image-processing to the heat image 10 including rotating, sliding, enlarging and reducing in such a way that the feature points 41, 42, 43 of the heat image 10 are superimposed on the reference feature points 61, 62, 63 of the reference heat image 30, respectively, on the basis of the coordinates $(X_{11}, Y_{11})$ of the point 41, $(X_{12}, Y_{12})$ of the point 42 and $(X_{13}, Y_{13})$ of the point 43 of the heat image 10 chosen by the feature point choosing part 121b and the coordinates $(X_{01}, Y_{01})$ of the point 61, $(X_{02}, Y_{02})$ of the point 62 and $(X_{03}, Y_{03})$ of the point 63 of the reference heat image 30 of the mold 1 set in advance.

In the step S1300, the corrected heat image generating part 121c calculates and certifies the coordinates $(X_{11}, Y_{11})$ of the point 41, $(X_{12}, Y_{12})$ of the point 42 and $(X_{13}, Y_{13})$ of the point 43 of the heat image 10 chosen by the part 121b (see S1310 in FIG. 7).

Next, the part 121c compares the coordinates $(X_{11}, Y_{11})$ of the point 41, $(X_{12}, Y_{12})$ of the point 42 and $(X_{13}, Y_{13})$ of the point 43 chosen by the part 121b with the coordinates $(X_{01}, Y_{01})$ of the point 61, $(X_{02}, Y_{02})$ of the point 62 and $(X_{03}, Y_{03})$ of the point 63 stored in the memory of the control unit 121 (see S1320 in FIG. 7).

Then, the part 121c decides whether the difference between the feature points (41, 42, 43) and the reference feature points (61, 62, 63) exists or not (see S1330 in FIG. 7).

Finally, (α) when deciding that there does not exist the difference between the feature points and the reference feature points, the part 121c regards the heat image 10 as the corrected heat image 20 without performing any image processing to the heat image 10. The step S1300 is finished and the step S1400 is carried out.

On the other hand, (β) when deciding that there exists the difference between the feature points and the reference feature points, the part 121c performs one or more image-processing including rotating, sliding, enlarging and reducing to the heat image 10 in such a way that the feature points 41, 42, 43 of the heat image 10 are superimposed on the reference feature points 61, 62, 63 of the reference heat image 30, and regards the heat image 10 to which performed such the image-processing as the corrected heat image 20. The step S1300 is finished and the step S1400 is carried out.

In the step S1400, a difference image 40 is generated as the difference between the corrected heat image 20 and the reference heat image 30, with the image 20 generated in the step S1300 being superimposed on the image 30 in such a way that the feature points (corrected feature points 51, 52, 53) of the image 20 are superimposed on the reference feature points 61, 62, 63 of the image 30.

As described above, the temperature measuring method according to the present invention is the method including: the step S1100 of picking up the heat image 10 of the mold 1; the step S1200 of choosing the feature points 41, 42, 43 of the heat image 10 of the mold 1 picked up in the step S1100; the step S1300 of generating the corrected heat image 20 by performing one or more image-processing to the heat image 10 including rotating, sliding, enlarging and reducing in such a way that the feature points 41, 42, 43 of the heat image 10 are superimposed on the reference feature points 61, 62, 63 of the reference heat image 30, respectively, on the basis of the coordinates $(X_{11}, Y_{11})$ of the point 41, $(X_{12}, Y_{12})$ of the point 42 and $(X_{13}, Y_{13})$ of the point 43 of the heat image 10 chosen by the feature point choosing part 121b and the coordinates $(X_{01}, Y_{01})$ of the point 61, $(X_{02}, Y_{02})$ of the point 62 and $(X_{03}, Y_{03})$ of the point 63 of the reference heat image 30 of the mold 1 set in advance; the step S1400 of generating the difference image 40 as the difference between the images 20 and 30, with the image 20 generated in the step S1300 being superimposed on the image 30 in such a way that the feature points (corrected feature points 51, 52, 53) of the image 20 are superimposed on the reference feature points 61, 62, 63 of the image 30.

Due to the above structure, when there occurs a difference in the imaging field-of-views of the images 10, 30, using the coordinate information of the points 41, 42, 43 and 61, 62, 63, the heat image 10 is corrected geometrically, thereby superimposed on the reference heat image 30 with high accuracy.

As a result, the difference image 40 of high reliability (high accuracy in the temperature information) generated easily.

One or more points (the embodiment shows two feature points 41, 42) within the feature points 41, 42, 43 in the heat image 10 are single pixel or cluster of pixels of the heat image 10 and displaying the highest or lowest temperature in the predetermined areas 21, 22 set in the heat image 10, and one or more points (the embodiment shows two feature points 61, 62) within the feature points 61, 62, 63 in the reference heat image 30 are single pixel or cluster of pixels of the reference heat image 30 and displaying the highest or lowest temperature in the predetermined areas 21, 22 set in the reference heat image 30.

Due to the above structure, there is no need to obtain the information for the position relationship (distance or posture) between the mold 1 and the camera 110 when picking up the images 10, 30, and choosing the feature points 41, 42 is only based on the image data of the image 10, choosing the reference feature points 61, 62 is also only based on the image data of the image 30.

As a result, without keeping, with high accuracy, the position relationship between the mold 1 and the camera 110 when picking up the images 10, 30, the difference image 40 of high reliability (high accuracy in the temperature information) generated easily, thereby facilitating the workability.

The measurement object of the temperature measuring method is the casting mold 1.

Thus, it becomes easy to decide whether the mold 1 repeated casting is normal or abnormal on the basis of the difference image 40, thereby improving the management quality for the casting process and reducing the managing labor (or the management costs).

Industrial Applicability

The present invention can be broadly applied to the technique of using the picked-up heat image of the measurement object and making the various decision for the object.

The invention claimed is:

1. A temperature measuring device comprising:
a feature point choosing means for choosing a single feature point or multiple feature points from a heat image of a measurement object;
a corrected heat image generating means for generating a corrected heat image by means of performing one or more image-processing to the heat image including rotating, sliding, enlarging and reducing in such a way that the feature point(s) of the heat image is (are) superimposed on a reference feature point(s) of a reference heat image picked up in advance, on the basis of a coordinate(s) of the feature point(s) of the heat image chosen by the feature point choosing means and a coordinate(s) of the reference point(s) of the reference heat image set in advance; and
a difference heat image generating means for generating a difference image as difference between the corrected heat image and the reference heat image, with the corrected heat image generated being superimposed on the reference image in such a way that the feature point(s) of the corrected heat image is (are) superimposed on the reference feature point(s) of the reference heat image,
wherein one or more points of the feature point(s) in the heat image is (are) single pixel or a cluster of pixels of the heat image and displaying the highest or lowest temperature in predetermined area(s) set in the heat image, and
wherein one or more points of the reference feature point(s) in the reference heat image is (are) single pixel or a cluster of pixels of the reference heat image and displaying the highest or lowest temperature in predetermined area(s) set in the reference heat image.

2. The device according to claim 1, further comprising:
an image pick up means for picking up the heat image.

3. The device according to claim 1 or 2,
wherein at least one of the feature point(s) of the heat image is (are) set as a point fixed relatively to the image pick up means when picking up the heat image.

4. The device according to claim 1 or 2,
wherein the measurement object is a casting mold having a particular portion where becomes higher or lower temperature than surroundings, and
wherein the areas set in the heat image and the reference heat image are set as including the particular portion.

5. The device according to claim 1 or 2,
wherein at least one of the feature point(s) of the heat image is (are) set as a point fixed relatively to the image pick up means when picking up the heat image,
wherein the measurement object is a casting mold having a particular portion where becomes higher or lower temperature than surroundings, and
wherein the areas set in the heat image and the reference heat image are set as including the particular portion.

6. A temperature measuring method, comprising:
picking up a heat image of a measurement object;
choosing a single feature point or multiple feature points from the heat image of the measurement object;
generating a corrected heat image by means of performing one or more image-processing to the heat image including rotating, sliding, enlarging and reducing in such a way that the feature point(s) of the heat image is (are) superimposed on reference feature point(s) of a reference heat image picked up in advance, on the basis of a coordinate(s) of the feature point(s) of the heat image and a coordinate(s) of the reference point(s) of the reference heat image set in advance; and
generating a difference image as difference between the corrected heat image and the reference heat image, with the corrected heat image generated being superimposed on the reference image in such a way that the feature point(s) of the corrected heat image is (are) superimposed on the reference feature point(s) of the reference heat image,
wherein one or more points of the feature point(s) in the heat image is (are) a single pixel or a cluster of pixels of the heat image and displaying the highest or lowest temperature in predetermined area(s) set in the heat image, and
wherein one or more points of the reference feature point(s) in the reference heat image is (are) a single pixel or a cluster of pixels of the reference heat image and displaying the highest or lowest temperature in predetermined area(s) set in the reference heat image.

7. The method according to claim 6,
the measurement object is a casting mold.

8. A temperature measuring device comprising:
a feature point choosing part that chooses a single feature point or multiple feature points from a heat image of a measurement object;
a corrected heat image generating part that generates a corrected heat image by performing one or more image-processing to the heat image including rotating, sliding, enlarging and reducing in such a way that the feature point(s) of the heat image is (are) superimposed on a reference feature point(s) of a reference heat image picked up in advance, on the basis of a coordinate(s) of the feature point(s) of the heat image chosen by the feature point choosing part and a coordinate(s) of the reference point(s) of the reference heat image set in advance; and a difference heat image generating part that generates a difference image as difference between the corrected heat image and the reference heat image, with the corrected heat image generated being superimposed on the reference image in such a way that the feature point(s) of the corrected heat image is (are) superimposed on the reference feature point(s) of the reference heat image,
wherein one or more points of the feature point(s) in the heat image is (are) single pixel or a cluster of pixels of the heat image and displaying the highest or lowest temperature in predetermined area(s) set in the heat image, and
wherein one or more points of the reference feature point(s) in the reference heat image is (are) single pixel or a cluster of pixels of the reference heat image and displaying the highest or lowest temperature in predetermined area(s) set in the reference heat image.

* * * * *